United States Patent [19]

Yamauchi et al.

[11] 4,194,864
[45] Mar. 25, 1980

[54] THREE-DIMENSIONAL AUTOMATIC WAREHOUSE EQUIPMENT

[75] Inventors: Noriyuki Yamauchi, Kobe; Yoshiaki Toko, Hyogo; Takao Ehara, Takasago, all of Japan

[73] Assignee: Mitsubishi Jukogyo Kabushiki Kaisha, Tokyo, Japan

[21] Appl. No.: 861,004

[22] Filed: Dec. 15, 1977

[30] Foreign Application Priority Data

Dec. 27, 1976 [JP] Japan .................... 51-156428
Jul. 21, 1977 [JP] Japan .................... 52-86618

[51] Int. Cl.² .................... B66F 9/14; B65G 1/06
[52] U.S. Cl. .................... 414/283; 414/669; 414/785
[58] Field of Search .................... 214/16.4 R, 16.4 A, 214/750, 730, 731; 414/281, 283, 785, 669

[56] References Cited

U.S. PATENT DOCUMENTS

| 2,727,638 | 12/1955 | Sestan | 214/16.1 CE |
|---|---|---|---|
| 3,467,264 | 9/1969 | Armington | 214/16.4 A |
| 3,512,672 | 5/1970 | Carpenter | 214/730 |
| 3,526,330 | 9/1970 | Armington | 214/731 |
| 3,549,025 | 12/1970 | Messner | 214/16.4 A |
| 3,567,055 | 3/1971 | Preto | 214/730 |
| 3,977,542 | 8/1976 | Stolmer | 214/16.4 A |
| 4,016,987 | 4/1977 | Stolmer | 214/16.4 A |

FOREIGN PATENT DOCUMENTS 1222857 8/1966 Fed. Rep. of Germany .
51-120572 10/1976 Japan .

Primary Examiner—Stephen G. Kunin
Assistant Examiner—Terrance L. Siemens
Attorney, Agent, or Firm—Wenderoth, Lind & Ponack

[57] ABSTRACT

A three-dimensional storage apparatus consists of a stacker truck movable along an aisle formed between opposing sets of cantilever arms at different levels projecting from a plurality of pillars disposed on each side of the aisle. The stacker truck has a vertically movable loader upon which transfer forks are pivotally mounted for displacement between an article support position and a stowed position. With the transfer forks in the stowed position the width of the stacker truck is significantly reduced thus allowing a reduction in aisle width and an increase in storage efficiency.

5 Claims, 22 Drawing Figures

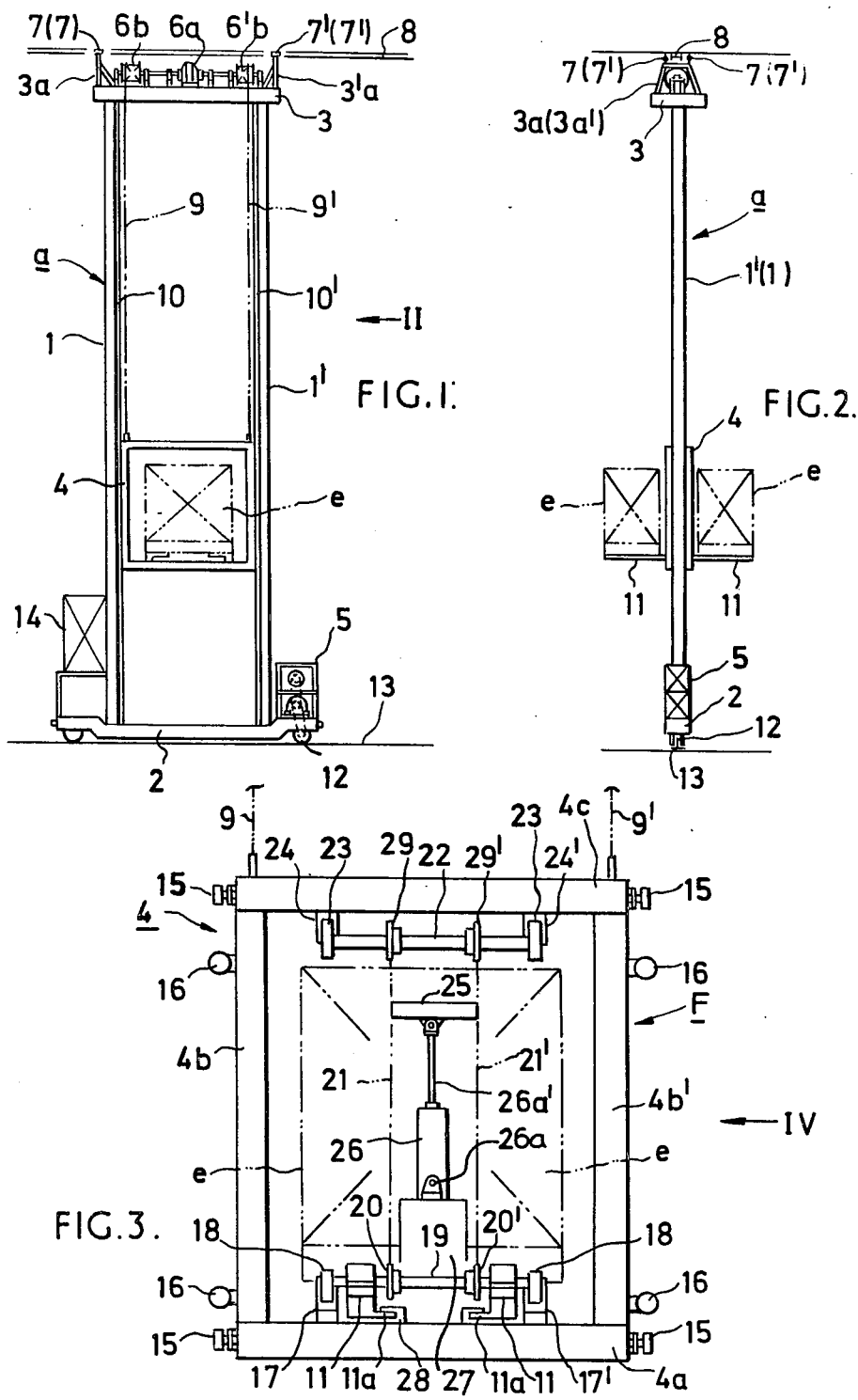

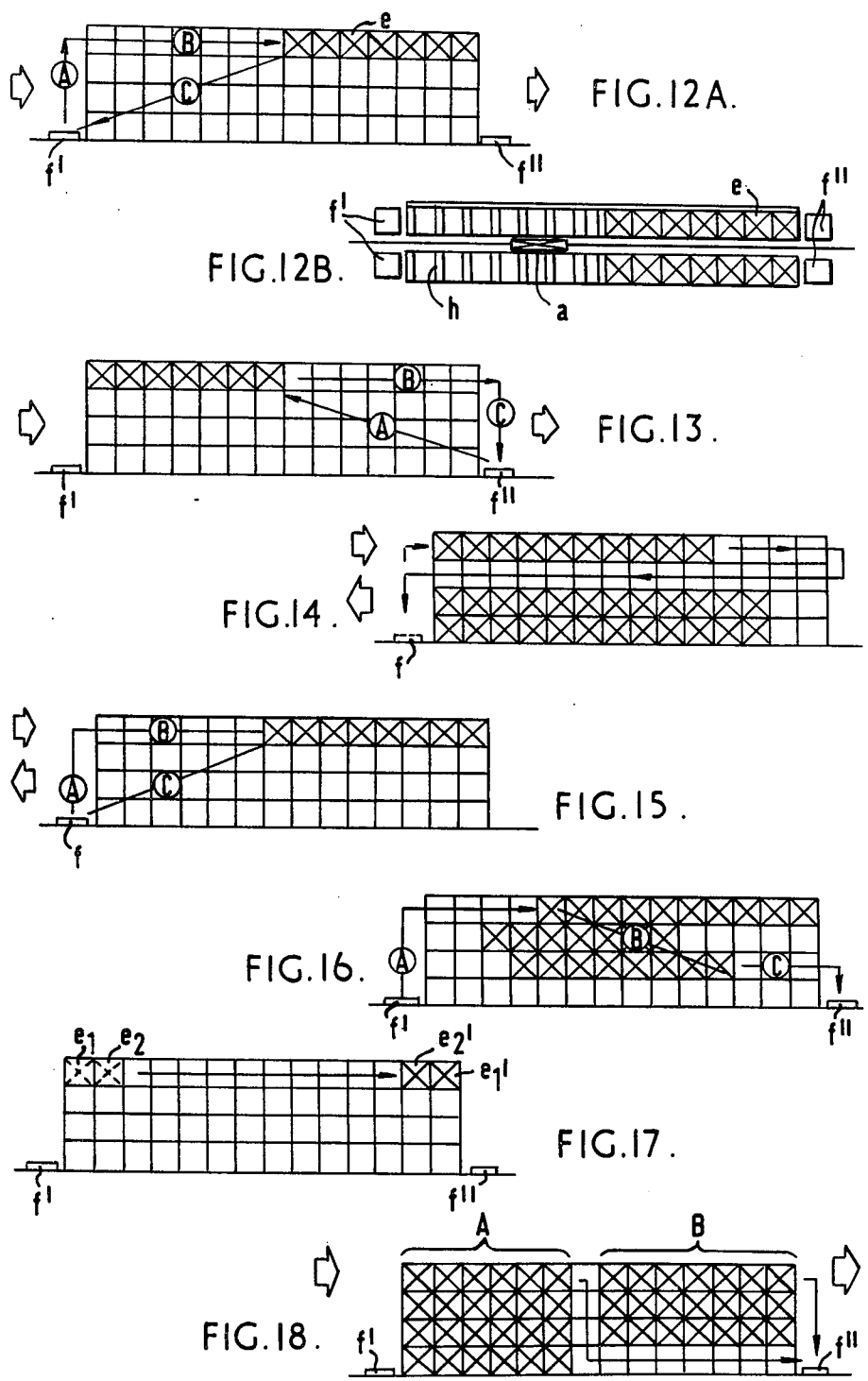

THREE-DIMENSIONAL AUTOMATIC WAREHOUSE EQUIPMENT

The present invention relates to three-dimensional automatic warehouse equipment and stacker trucks therefor.

In previously known three-dimensional automatic warehouse equipment, when storing a large variety of small amounts of items such as baggage, to which the following description will be limited as a specific example of such items, it is necessary to employ the so-called "order-picking" principle and among apparatus of the type fulfilling this requirement is a known loading/unloading apparatus called a "mono-stack" system. In this system, a baggage transfer fork provided on an elevator-loader of a stacker truck is made to extend in the horizontal direction at right angles to the direction of travel of the stacker truck, so as to make it possible to insert the fork under a pallet, on which the baggage is normally loaded, located in a loading bay or platform. The loader is then elevated as little to lift the baggage from the bay or platform, the fork is retracted to accommodate the baggage within the loader, and the stacker truck is advanced towards a particular storage rack. When it has reached the rack, the fork is extended to present the baggage to the rack, then the loader is lowered a little to place the pallet with its baggage on the rack, subsequently the fork is retracted and stowed within the loader, and the stacker truck is withdrawn towards the bay or platform to be ready for the next storage operation. Also, delivery is carried out according to the same process but in the reversed sequence. With regard to the loader, since it must accommodate both the baggage and the retracted fork during storage (or delivery), the lateral width of the loader is quite large. Consequently, it is necessary to provide aisles, along which the stacker truck can pass, with a large width between the racks, the racks being arranged to face each other on opposite sides of the aisles, and thus the storage efficiency of the system is low.

On the other hand, for storing a small variety of large amounts of baggage, a loading/unloading apparatus of the so-called "dolly" system in which a stacker truck and dollies are combined can be employed. For this system, dollies (self-propelled pallets), which travel along racks (storage shelves) to effect transfer of the baggage, are necessary in addition to the stacker truck. Furthermore, since, as described above, the dollies travel along the racks, the mechanical stiffness of the racks must be greatly increased, and consequently, this system has a disadvantage that the installation expense for the three-dimensional automatic warehouse equipment including the dollies is large.

An object of the present invention to overcome the above-mentioned disadvantages.

According to one aspect of the invention, three-dimensional automatic warehouse equipment including a stacker truck provided with a loader adapted to be moved in a vertical direction by elevator means to raise or lower a baggage transfer fork to any desired level, and racks facing each other on opposite sides of a travel path or aisle for said stacker truck, is characterized in that said baggage transfer fork is provided on said loader so as to be displaceable between a baggage support position projecting from said loader and a stowed position retracted into said loader by rotating through 90° either along a vertical plane or along a horizontal plane, that said racks are constituted by a plurality of pillars disposed along said travel path with a plurality of cantilever arms projecting from each said pillar toward said travel path at a plurality of levels, and that the spacing between said arms adjacent to each other on the same horizontal plane is somewhat larger than the baggage support width of said baggage transfer fork. Thus, with the three dimensional automatic warehouse equipment in accordance with the invention it is unnecessary to provide a travel path of a large width between the facing racks, resulting in improved storage efficiency. Also, dollies are not necessary, and there is no need to construct racks which have a high mechanical stiffness, thereby reducing the installation expense.

With three-dimensional automatic warehousing equipment according to the present invention as described above, when storing baggage, the stacker truck is advanced towards the particular arms (a pair of arms adjacent to each other on the horizontal plane) where the baggage is to be stored. During this period, the baggage transfer fork which has been rotated through 90° from the stowed position to the baggage support position so that it projects from the loader, and with the baggage loaded thereon, will move jointly with the stacker truck through the space between the level of said arms and the next upper level. When the stacker truck has reached the required arm position, the loader is lowered and the baggage transfer fork descends through the space between the pair of adjacent arms to place the baggage on said respective arms. Once the baggage has been transferred to the arms, the stacker truck is withdrawn to a position where the rotation of the baggage transfer fork is not interfered with. Thereafter the baggage transfer fork is rotated 90° from the baggage support position to the stowed position to be retracted into the loader, and the stacker truck is further withdrawn while moving the loader in the vertical direction to be ready for the next storage operation. When delivering baggage, the stacker truck is advanced as the loader is moved in the vertical direction up to a position just behind the particular arms from which delivery is to be made, and where the rotation of the baggage transfer fork is not interfered with. At this instant the baggage transfer fork is stowed within the loader, but as soon as the stacker truck has advanced to the aforementioned position, the baggage transfer fork is rotated through 90° from the stowed position to the baggage support position so as to project from the loader, and then the stacker stack is further advanced. During this further advance, the baggage transfer fork is moved in the horizontal direction through the space just beneath the level of the said arms jointly with the stacker truck. Further, when the stacker truck has reached the arm position from which delivery is to be made, the loader is raised. During this period the baggage transfer fork rises through the space between the pair of adjacent arms to receive the baggage from the arms. Once this operation has been effected, the stacker truck is withdrawn. During this withdrawal, the baggage transfer fork and the baggage placed on the fork moves through the space between the level of the aforementioned arms and the next upper level jointly with the stacker truck to deliver the baggage from the racks.

With three-dimensional automatic warehouse equipment according to the present invention, since the baggage transfer fork and the baggage placed thereon are moved through the racks, that is, through the space between the arms at the adjacent upper and lower levels when the baggage is stored in a rack and delivered from a rack as described above, it is only necessary to provide a small gap sufficient to allow passage of the stacker truck main body between the facing racks on the opposite sides of the travel path, so that the width of the travel path can be reduced and the storage efficiency thereby enhanced. In addition to the advantages of three-dimensional automatic warehouse equipment according to the present invention referred to hereinbefore, since the structure of the baggage transfer fork may be made simple and light in weight, the stacker truck need not be so rigid, thus reducing its cost and therefore the total installation expense. In this respect, however, the baggage transfer forks of the prior art have been of the extendable/retractable type having a complex and heavy structure, so that the stacker truck had to be constructed with greater mechanical strength. By contrast, the baggage transfer fork according to the present invention has a rotatable arrangement and has a simple and light structure; thus such a stacker truck is less costly to manufacture. If the time required for inserting or withdrawing the fork, is shortened, then the storage and delivery capability of the three-dimensional automatic warehouse equipment can be enhanced, but in this respect, the extendable/retractable type of baggage transfer forks of the prior art need a lot of time inserting and withdrawing the fork. By contrast, the baggage transfer fork arrangement according to the present invention being of a rotatable nature can be inserted and withdrawn quickly, resulting in improved storage and delivery capability of the three-dimensional automatic warehouse equipment.

The three dimensional automatic warehouse equipment according to said one aspect may be further characterised in that said respective cantilever arms are detachably mounted on each pillar so that their mounting positions can be changed. This enables baggage of different heights to be easily loaded on the respective arms, the mounting positions of the respective arms on each pillar being changed to match the spacing between adjacent upper and lower arms with the height of the baggage.

According to another aspect of the invention, a stacker truck for three-dimensional automatic warehouse equipment comprises a loader adapted for vertical movement carrying a baggage transfer fork, and is characterised in that said baggage transfer fork is connected to said loader so as to be displaceable between a baggage support position projecting from said loader and a stowed position retracted into said loader by rotating through 90° either along a vertical plane or along a horizontal plane.

In order that the invention may be readily understood two preferred embodiments of three dimensional automatic warehouse equipment in accordance therewith will now be described with reference to the accompanying drawings in which:

FIG. 1 is a front view of a stacker truck according to one of the preferred embodiments;

FIG. 2 is a side view of the stacker truck as viewed in the direction of arrow (II) in FIG. 1;

FIG. 3 is a front view showing details of a loader;

Figure 4:
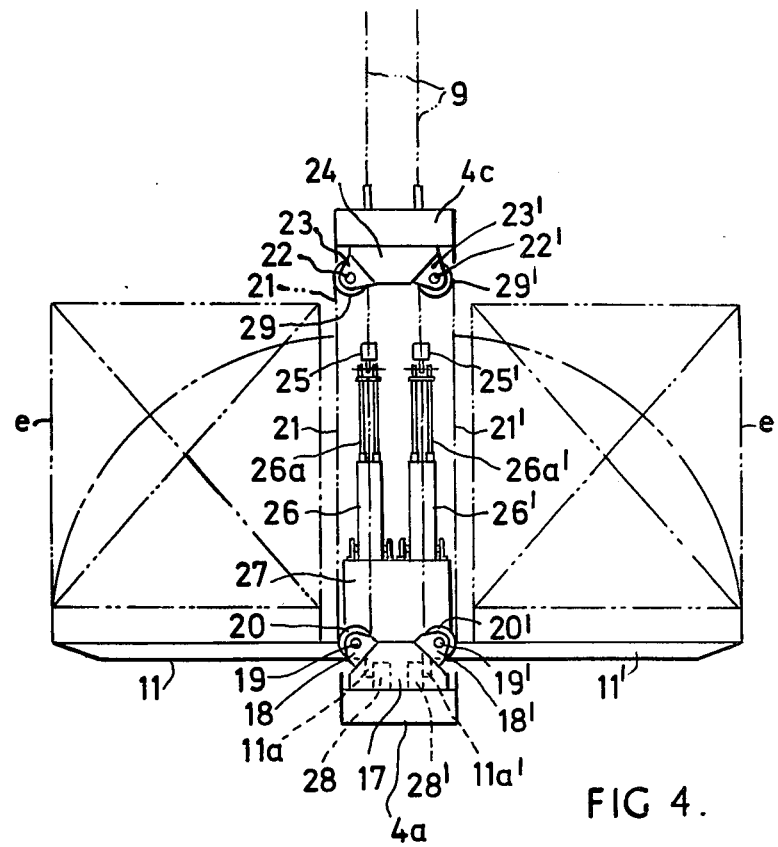
FIG. 4 is a side view of the loader as viewed in the direction of arrow (IV) in FIG. 3.
Figure 5:
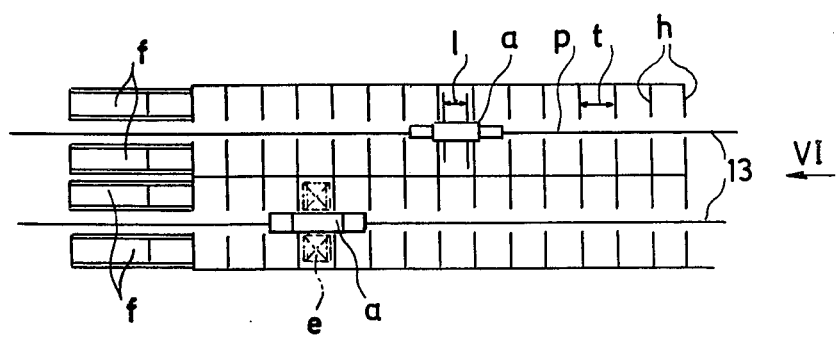
FIG. 5 is a plan view showing the entire layout of the equipment.
Figure 6:
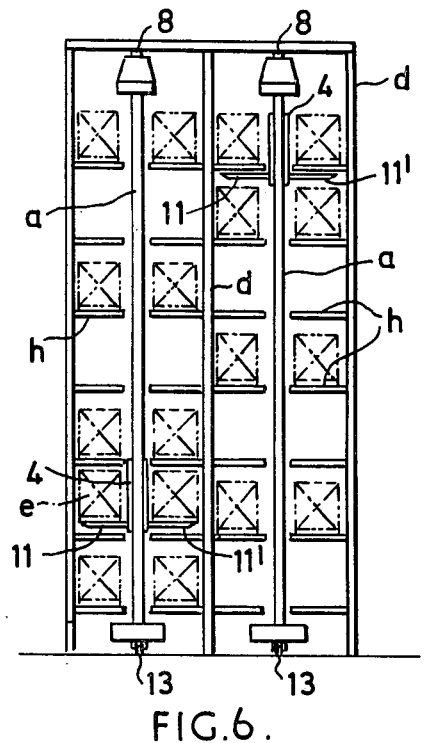
FIG. 6 is an enlarged side view of the equipment as viewed in the direction of arrow (VI) in FIG. 5.

FIGS. 12(A), 12(B) and 13 to 18 are diagrammatic views for explaining storage and delivery operations.

With regard to the embodiment illustrated in FIGS. 1 to 6, reference a in FIG. 1 designates a stacker truck main body consisting of a pair of vertical support masts 1 and 1', a lower frame 2 and an upper frame 3, references 10 and 10' designate guide rails mounted on the inside surfaces of the support masts 1 and 1', and reference F designates a loader that is movable in the vertical direction and is guided by the rails 10 and 10' (the loader F will be described in greater detail hereinafter). Reference 5 designates a travelling drive apparatus for the stacker truck disposed at one end of the lower frame 2, and reference 12 designates wheels driven by the travelling drive apparatus 5. The stacker truck main body is adapted to travel on a rail 13 laid on the floor surface of an aisle between racks in a warehouse building (See FIGS. 1, 2 and 5). In addition, a guide rail 18 is disposed on a ceiling of the warehouse building, a pair of brackets 3a and 3a' are mounted on the upper surface at opposite ends of the upper frame 3, a pair of guide rollers 7 are mounted on the bracket 3a so as to hold the guide rail 8 therebetween, and another pair of guide rollers 7' are mounted on the bracket 3a' so as to hold the guide rail 8. Thus, when the stacker truck main body a travels on the rail 13, the guide rail 8 and the guide rollers 7 and 7' jointly ensure that the upper portion of the stacker track main body a does not rock in the lateral direction. An elevator drive apparatus 6a is disposed on the central portion of the upper frame 3, for driving a pair of winch drums 6b and 6b'. Wire ropes 9 and 9' connect the winch drums 6b and 6b', respectively, and the loader F in such manner that, when the winch drums are driven in the direction of paying-out the wire ropes, the loader F is lowered, whereas when the winch drums are driven in the opposite direction, the loader F is raised.

Referring now to FIGS. 3 and 4, the loader F comprises a main body 4 consisting of a lower frame 4a, opposite side frames 4b and 4b' and an upper frame 4c. Guide rollers 15 and 16 are mounted on the outer surfaces of the top and bottom portions of both the side frames 4b and 4b' so as to make contact with the guide rails 10 and 10', a pair of bearing stands 17 and 17' are disposed on the upper surface at opposite ends of the lower frame 4a, and in each of these bearing stands 17 are mounted a pair of bearings 18 and 18'. In addition, two shafts 19 and 19' having pairs of sprockets 20 and 20' fixedly secured thereto are rotatably supported by the bearings 18 in the bearing stands 17 and 17'. A pair of baggage transfer forks 11 are provided having their base ends fixedly secured to opposite ends of the shaft 19 so as to be rotatable in a vertical plane, and another pair of baggage transfer forks 11' have their base ends fixedly secured to opposite ends of the shaft 19' so as also to be rotatable in a vertical plane. At their base, the forks 11 and 11' are provided with engaging members 11a and 11a' adapted to engage with stops 28 and 28', respectively, as will be described hereinafter. A pair of bearing stands 24 and 24' are mounted on the lower surface of the upper frame 4c, and two further shafts 22 and 22' are rotatably supported thereon by respective pairs of bearings 23 and 23'. Pairs of sprockets 29 and 29' are fixedly secured to the respective shafts 22 and 22', and are in alignment with respective sprockets 20 and 20' on the shafts 19 and 19'; the respective sprockets 29 and 29' are drivingly connected to sprockets 20 and 20' by endless roller chains 21 and 21' as shown in FIG. 3.

A support stand 27 is fixedly secured to the central portion of the lower frame 4a, and electrically operated telescopic cylinder units 26 and 26' are pivotally mounted on the support stand 27 on pins, 26a. Connecting members 25 are mounted on the chains 21 and 21' between the shafts 19 and 22 and connecting members 25' are mounted on the chains 21 and 21' between the shafts 19' and 22'. Rods 26a' of respective cylinder units are pivotally connected to the connecting members 25 and 25' by pins. The stops 28 are mounted on the lower frame 4a so as to be opposed to the engaging members 11a and 11a', respectively, and when the cylinder unit is operated in the extending direction, the baggage transfer forks 11 are rotated downwards through 90° from their vertical positions (stowed positions) by the connecting members 25, chains 21 and 21' and shaft 19 and the engaging member 11a strikes against the stop 28 to hold the forks 11 in the deployed horizontal position (baggage support position), and when the cylinder unit is operated in the opposite direction, the baggage transfer forks 11 are rotated upwards through 90° from the deployed position by the connecting members 25, chains 21 and 21' and shaft 19 and are held in the stowed position. The baggage transfer forks 11' are generated in the same way. The racks will now be described with reference to FIGS. 5 and 6. A travel path p (or aisle) of a stacker truck main body a, has a plurality of pillars disposed there along. Cantilever arms h project from each pillar towards the travel path p at a plurality of levels. A space t is provided between adjacent arms h on the same horizontal plane and a space l is provided between the baggage transfer forks 11 or 11' (baggage support width); the space t between the arms h is somewhat larger than the space l between said forks. Referring to FIG. 1, a control panel 14 is provided for controlling the travel drive apparatus 5, the elevator drive apparatus 6a and the cylinder units 26 and 26'. With reference to FIGS. 1 to 4 and 6 the baggage is denoted e, and in FIG. 5 storage and delivery platforms disposed at baggage loading bays of the three-dimensional automatic warehouse are denoted f.

Now the operation of the above-described three-dimensional automatic warehouse equipment will be described.

By way of example, in the case where two pieces of baggage e are to be stored simultaneously in opposed racks, they are carried by a fork lift to the respective storage and delivery platforms f and placed thereon. At the same time, the stacker truck main body a is reversed to be driven toward the storage and delivery platforms. During this process, if there is no baggage on the arms h at any level at a position between the arms on which the baggage is to be stored and the storage and delivery platforms, then when the stacker truck main body has been reversely driven to the position where the arms are vacant, it is stopped, and subsequently the loader F is lowered to the lower limit position while the forks 11 and 11' are rotated from their stowed to their deployed positions, and then the stacker truck main body is further driven reversely to bring the forks 11 and 11' to the positions just beneath the baggage on the storage and delivery platforms. However, if there is baggage at some level on all of the arms between the arms on which the baggage is to be stored and the storage and delivery platforms, then the stacker truck main body is reversely driven to the left (as viewed in FIG. 5) of the storage and delivery platforms; subsequently the loader F is lowered to the lower limit position while the forks 11 and 11' are rotated from their stowed to their deployed positions, and then the stacker truck main body is advanced a little to bring the forks to the positions just beneath the baggage placed on the storage and delivery platforms. Next, the loader F is raised a little to engage the baggage and raise it from the storage and delivery platforms. Suppose, for example, that the baggage is to be accommodated on the innermost arms of the arms at the second level from the bottom in the left two columns as viewed in FIG. 6, then the loader is further elevated to raise the forks and the baggage to a level slightly higher than the respective arms at the second level from the bottom, and subsequently, the stacker truck main body is driven in the advancing direction towards the said innermost arms on which the baggage is to be stored. During this period, the forks and the baggage move through the space between the respective arms at the second level from the bottom and the respective arms at the third level from the bottom, jointly with the stacker truck main body. When the forks and the baggage have reached said innermost arms position, the stacker truck main body is stopped, and then the loader is lowered, and the forks descend through the space between the arms and transfer the baggage onto the arms. Subsequently, the stacker truck main body is reversely driven towards the storage and delivery platforms. Then the apparatus is returned to the original state, and the next baggage is stored at the positions just ahead of last stored baggage. As described above, where baggage is to be stored successively on the arms at a predetermined level, the operation is the so-called innermost packing operation in which the baggage is successively stored beginning with most remote arms and ending with the nearer arms. It is to be noted that when baggage is to be successively stored starting with the most remote position only at a given level in a given column, either forks 11 or 11' are used. Furthermore, when delivering the stored baggage, the operations are carried out in the same manner but in the reverse sequence.

Figure 7A:
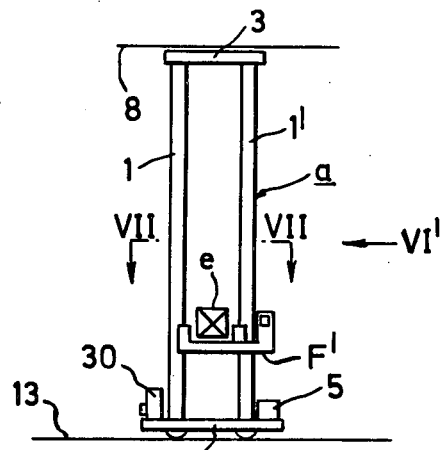
FIG. 7(A) is a front view of a stacker truck of the other preferred embodiment.
Figure 7B:
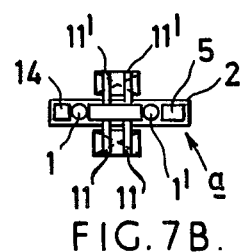
FIG. 7(B) is a plan view taken along line (VII)—(VII) as viewed in the direction of arrows in FIG. 7(A)
Figure 7C:
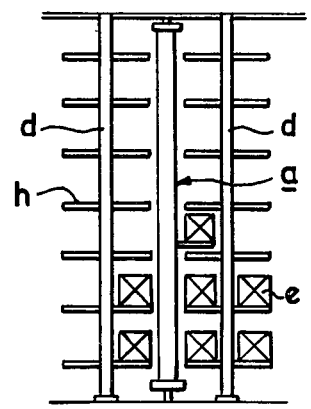
FIG. 7(C) is a side view as viewed in the direction of arrow (VI') in FIG. 7(A)
Figure 8A:
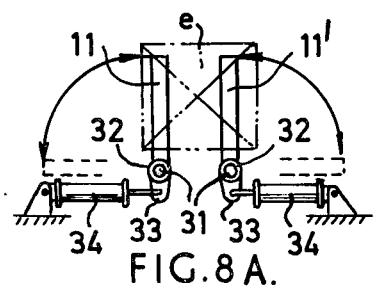
FIG. 8(A) is plan view showing one example of the baggage transfer forks.

In another preferred embodiment illustrated in FIGS. 7(A), 7(B) and 7(C), a stacker truck main body a is constituted by a pair of vertical support masts 1 and 1', a lower frame 2 and an upper frame 3. A travel drive apparatus 5 is mounted at one end of the lower frame 2, and an elevator drive apparatus 30 is mounted at the other end of the lower frame 2. A guide rail 8 is disposed on a ceiling of a warehouse building, and a rail 13 is disposed on a floor surface of the aisles between the racks, the stacker truck main body a being adapted to travel along the rails 8 and 13. A loader F' can ascend and descend along the supports 1 and 1', (a winch drum and a wire rope for raising and lowering the loader and a guide rail and guide rollers for guiding vertical movement of the loader, are omitted from the Figures). Referring to FIG. 8(A) pins 31 are fixedly secured on the loader F', and sleeves 32 are loosely fitted on respective pins to which latter are fixedly secured arms 33. A pair of baggage transfer forks 11 are provided having their base ends fixedly secured to respective sleeves 32. A pair of hydraulic telescopic cylinder units 34 are mounted between respective arms 33 and the loader F' and, when the units are operated in the contracting direction, respective baggage transfer forks 11 are rotated through 90° in a horizontal plane from the dotted-line position (stowed position) in FIG. 8(A) to be held in the solid-line position (baggage support position), whereas when the respective cylinder units 34 are operated in the other direction, the respective baggage transfer forks 11 are rotated through 90° in the horizontal plane from the solid-line position to the dotted-line position. The above-described operations are also the same with respect to the other pair of baggage transfer forks 11' shown in FIG. 7(B). Referring to FIGS. 7(C), 9, 10 and 11 a plurality of pillars d are disposed along each aisle or travel path of the stacker truck, and cantilever arms h project from each pillar toward the travel path at a plurality of levels, the respective arms h being detachably mounted on each pillar d by means of bolts. It is to be noted that the purpose of detachably mounting the respective arms on each pillar strut is to be able to change the mounting positions of the respective arms on each pillar to match the spacing between adjacent upper and lower arms with the height of the baggage when the height of the baggage to be stored is varied.

Various examples of the operation of the above-described three-dimensional automatic warehouse equipment will be described with reference to FIGS. 12 to 18. For a storing operation of the early storage-early-delivery type reference is made to FIGS. 12(A) and 12(B). Baggage e to be stored is carried to storage platforms f by a fork lift and is placed thereon. At the same time, the stacker truck main body a is reversely driven towards the storage platforms f'. During this period, the forks 11 and 11' are at the dotted-line positions (stowed positions) in FIG. 8(A). When the stacker truck main body has reached the position between the storage platforms, the forks are rotated from the dotted-line position to the solid-line position and are disposed below the storage platforms, and subsequently the loader F' is raised a little to engage and lift the baggage. Assuming that this baggage is to be stored on the arms h at the uppermost level, then the forks, as well as the baggage, are raised up to a level slightly higher than the arms at the uppermost level by further raising the loader. (See Ⓐ in FIG. 12(A)), and subsequently the stacker truck main body is advanced. During this period, the forks, as well as the baggage move through the space just above the respective arms at the uppermost level, jointly with the stacker truck main body (see Ⓑ in FIG. 12(A)). When the forks as well as the baggage have reached the desired arm positions, the stacker truck main body is stopped and then the loader is lowered, whereby, the forks descend through the space between the arms and transfer the baggage onto the arms. Next, the forks are rotated from the solid-line position to the dotted-line position in FIG. 8(A) to be stowed within the loader, and then the loader is lowered while reversely driving the stacker truck main body (see Ⓒ in FIG. 12(A)) to be ready for the next storage operation. In FIGS. 12(A) and 12(B), f" designates delivery platforms.

Turning now to the delivery operation of the early storage-early delivery system reference is made to FIG. 13. The stacker truck main body a and the loader F' reach the arm position from which delivery is to be made, by movement along the path marked Ⓐ in FIG. 13. Next, the forks 11 and 11' are rotated from the dotted-line position to the solid-line position in FIG. 8(A), subsequently the loader F' is raised a little to engage and lift the baggage e, and then the stacker truck main body is advanced. During this movement, the forks as well as the baggage move along the path marked Ⓑ in FIG. 13. Then the loader is lowered. During this period, the forks as well as the baggage move along the path marked Ⓒ in FIG. 13 to place the baggage on the delivery platforms f". Next, the forks are rotated from the solid-line position to the dotted-line position in FIG. 8(A) to be ready for the next delivery operation.

For another example of a delivery operation for an early storage-early delivery system, reference is made to FIG. 14. While the stacker truck main body a is held stationary at the position of a storage and delivery platform f, the loader F' is raised while the forks 11 and 11' are kept projecting in the solid-line position in FIG. 8(A). When the forks have come to a level slightly lower than the arms h at the uppermost level, the loader is stopped. Subsequently, the stacker truck main body is advanced to the arm position from which delivery is to be made. During this advance, the forks move just under the respective arms at the uppermost level, jointly with the stacker truck main body. Next, the loader is raised a little to engage and lift the baggage, then the stacker truck main body is further advanced to bring the forks as well as the baggage out of the racks, subsequently the loader is lowered to a predetermined level (in the illustrated example, to the second level from the top), and then the stacker truck main body is reversely driven toward the storage and delivery platform. During this reversal, the forks as well as the baggage move through a "delivery only" aisle at the second level from the top, jointly with the stacker truck main body. Next, the loader is lowered to place the baggage on the storage and delivery platforms f. It is to be noted the above-designated "delivery only" aisle could be provided at any appropriate level within the racks.

FIG. 15 shows storage and delivery operations for an early storage-later-delivery paths system, the Ⓐ→Ⓑ→Ⓒ representing the storage operation, and paths Ⓒ→Ⓑ→Ⓐ representing the delivery operation.

FIG. 16 shows a complex cycle in which a storage operation and a delivery operation are effected in succession, the storage operation being effected along the path represented by arrow Ⓐ, displacement of the loader F' to the arm position from which delivery is to be made being effected along the path represented by arrow Ⓑ and the delivery operation being effected along the path represented by arrow Ⓒ.

In the early storage-early-delivery system shown in FIG. 13, if the baggage should remain on the storage side (see $e_1$, $e_2$ in FIG. 17), then further storage at the same level would be impossible. However, if the remaining baggage is shifted forward and closed up (see $e_1$40, $e_2'$ in FIG. 17), then more baggage can be accommodated. FIG. 17 shows such an arrangement.

FIG. 18 shows the state in an early storage-early delivery system, where the baggage is stored and classified according to varieties, or according to quantities, (see (A) and (B) in FIG. 18) so as to be adapted for order-picking. In this case, the baggage in section (A) is taken out through a vertical delivery-only aisle and a horizontal delivery-only aisle, and the vertical delivery-only aisle is formed by removing the arms h in the corresponding portions of the racks.

Figure 8B:
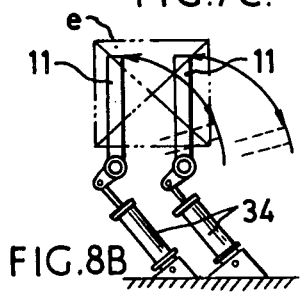
FIG. 8(B) is a plan view showing another example of the same forks.
Figures 9, 10:
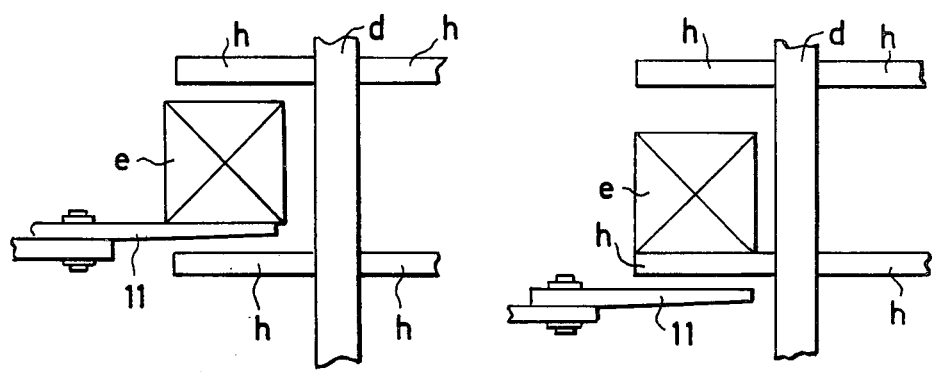
FIG. 9 is a schematic view showing the position prior to transfer of baggage onto the arms.
FIG. 10 is a schematic view showing the position after the transfer of the baggage onto the arms.
Figure 11:
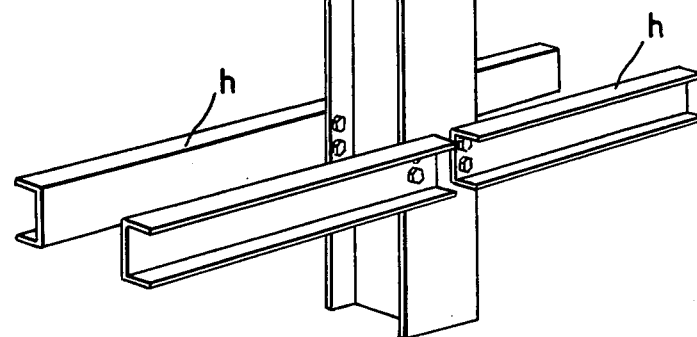
FIG. 11 is a perspective view showing an arrangement of a pillar and arms.

It is to be noted that the hydraulic cylinder devices, shown in FIG. 8(A) could be mounted on the loader F' in the manner shown in FIG. 8(B) so as to rotate the baggage transfer forks 11.

While the present invention has been described above in connection with two preferred embodiments, it will be appreciated that the invention is not be limited to these embodiments but various modifications in design can be made within the scope of the following claims:

What we claim is:

1. A three dimensional automatic warehouse apparatus comprising:
   at least two spaced opposed racks defining between them an aisle;
   a stacker truck movable along said aisle and having a vertically movable loader thereon, elevator means for raising and lowering said loader to a desired level, and a transfer fork pivotally mounted on said loader for being displacable between an article support position in which said transfer fork projects horizontally from said loader in a direction substantially perpendicular to the plane of movement of said stacker truck along said aisle and a stowed position by rotation through 90° in a plane perpendicular to the plane of movement of said stacker along said aisle;
   said racks having a plurality of pillars disposed along said aisle and a plurality of cantilever arms projecting from each pillar toward the aisle at a plurality of levels, the space between adjacent arms on the same level being larger than the width of said transfer fork, and the space between the ends of said cantilever arms pillars on opposite sides of said aisle being greater than the dimension of said stacker truck transversely of the direction of the aisle with the fork in the stowed position and less than the dimension of said stacker truck transversely of the direction of the aisle with the fork in the projected position.

2. A three dimensional automatic warehouse apparatus as claimed in claim 1 in which said transfer fork is rotatable in a vertical plane.

3. A three dimensional automatic warehouse apparatus as claimed in claim 1 in which said transfer fork is movable in a horizontal plane.

4. A three dimensional automatic warehouse apparatus as claimed in claim 1 in which said loader has fork pivoting means thereon connected to said fork for pivoting said fork.

5. A three dimensional automatic warehouse apparatus as claimed in claim 1 in which said loader has a transfer fork pivotally mounted on each of the opposite sides of said loader.

* * * * *